Feb. 16, 1943.  S. B. CRARY  2,311,370
AUTOMATIC RECLOSING CIRCUIT BREAKER EQUIPMENT
Filed Sept. 18, 1941
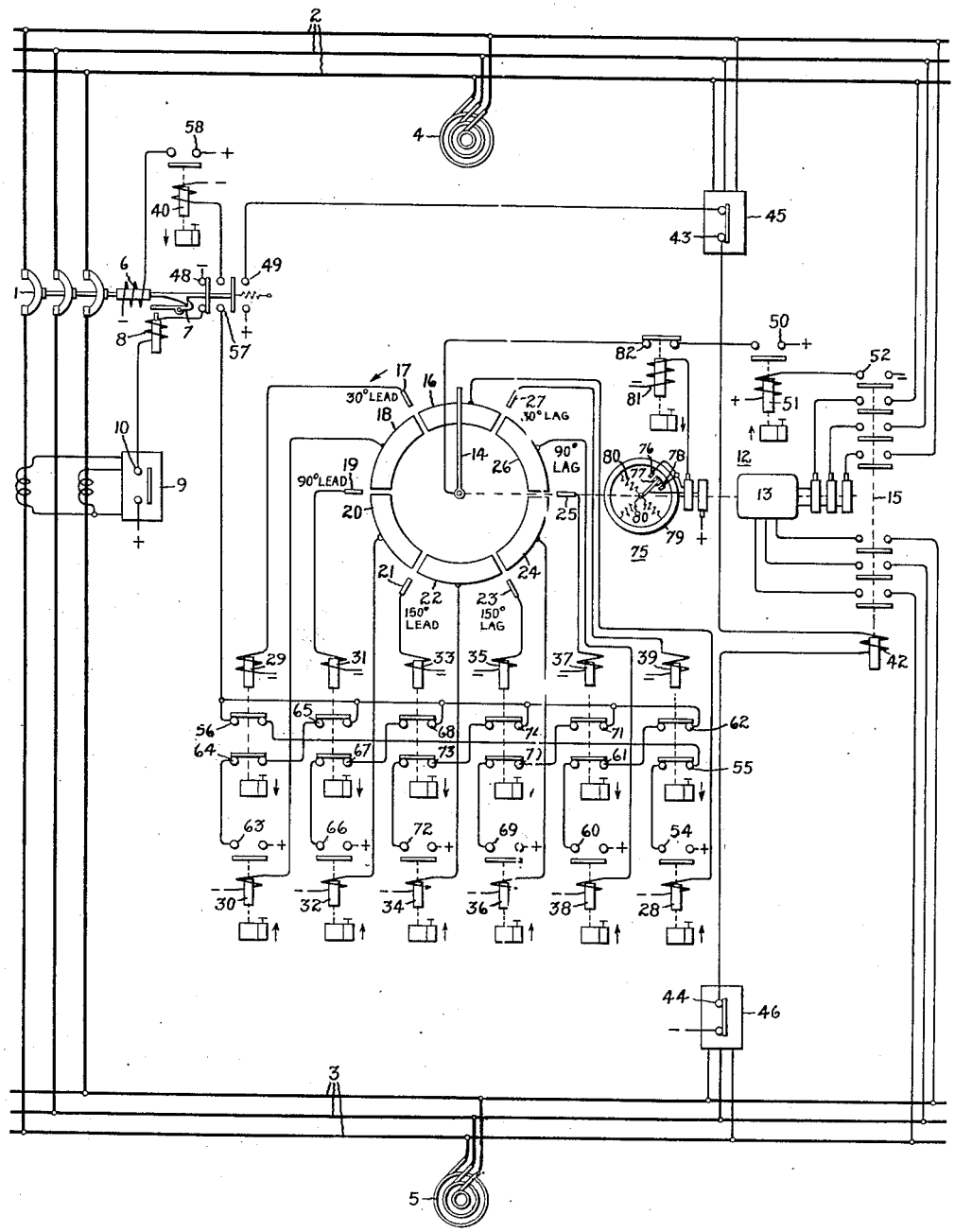
Inventor:
Selden B. Crary;
by Harry E. Dunham
His Attorney.

Patented Feb. 16, 1943

2,311,370

UNITED STATES PATENT OFFICE 2,311,370

AUTOMATIC RECLOSING CIRCUIT BREAKER EQUIPMENT

Selden B. Crary, Schenectady, N. Y., assignor to General Electric Company, a corporation of New York Application September 18, 1941, Serial No. 411,282

10 Claims. (Cl. 171—118)

My invention relates to automatic reclosing circuit breaker equipments and particularly to an equipment for controlling the reclosing of a circuit breaker which is arranged to interconnect two energized alternating current circuits.

In order to restore service over an alternating current transmission line which interconnects two alternating current systems after a fault has effected an interruption of the line, arrangements have been proposed heretofore for quickly re-establishing the transmission line after it has been interrupted so as to prevent the two systems from falling out of step. One of the major disadvantages of such a quick re-establishment of the connection between the two systems, however, is the possibility that they may be so far out of synchronism by the time the connection is established that it does not result in the two systems pulling into step with respect to each other.

Also in some large electric power systems means are provided for effecting the opening of circuit breakers at predetermined points in the system, when an out-of-step condition occurs, so as to separate the system into a number of isolated parts each of which has the necessary generating capacity to supply the load connected thereto. In such a system it is desirable to reconnect the isolated parts as quickly as possible when the frequency difference and the phase angle displacement are such as to allow resynchronization.

One object of my invention is to provide an arrangement of apparatus for re-establishing the interconnection of two alternating current energized circuits, after they have been separated from each other, only after assurance is obtained that the re-establishment of the inter-connection will result in the two systems pulling into step with respect to each other.

In accordance with my invention, I provide an arrangement of apparatus for effecting the reclosing of a circuit breaker interconnecting two energized alternating current circuits which depends upon the phase angle displacement between the voltages of the two circuits, the relative frequencies of these two voltages at the particular angular displacement, and in those systems that may require it, the rate at which the change in frequency difference is occurring. When the rate of change of frequency difference is below a predetermined value and when the phase angle displacement between the voltages of the two circuits is very small, the reclosing of the circuit breaker is effected over the maximum possible range of frequency difference. At larger phase angle displacements between the voltages, the range of frequency difference, during which the circuit breaker can be reclosed, is decreased. For example, when the phase angle displacement of the voltage is 180°, the range of frequency difference, during which the circuit breaker can be reclosed, is a minimum. Therefore, when the rate of change of frequency difference is below a predetermined value, this arrangement allows the circuit breaker to be reclosed at any angular displacement of the voltages of the two circuits being interconnected by the circuit breaker provided the frequency difference corresponding to that angular displacement is of such a value as to allow the two circuits to pull into step. The best angular displacement of voltages for synchronizing is about zero degrees, and the worst angular displacement is about 180°, but usually the two circuits can pull into synchronism when the phase angle displacement of the voltages, at the time the two circuits are connected together, is 180° provided the frequency difference is very low.

My invention will be better understood from the following description when taken in connection with the accompanying drawing the single figure of which diagrammatically illustrates an embodiment of my invention in connection with an automatic reclosing arrangement for a circuit breaker interconnecting two energized alternating current circuits, and the scope of my invention will be pointed out in the appended claims.

In the accompanying drawing, I represents a circuit breaker interconnecting two alternating current circuits 2 and 3, respectively energized by suitable sources of current 4 and 5. As shown, the circuit breaker I is of the well known latch closed type comprising a closing coil 6, a latch 7 for holding the circuit breaker I in its closed position, and a trip coil 8 for releasing the latch 7. Any suitable fault responsive means, examples of which are well known in the art, may be provided for effecting the energization of the trip coil 8 in response to an out-of-step or fault condition. Since the details of such fault responsive means form no part of my present invention, I have represented such means by a rectangle 9 containing contacts 10 which, when closed, complete an energizing circuit for the trip coil 8.

For controlling the energization of the closing coil 6 when the circuit breaker I is open, I provide, in accordance with my invention, a rotatable device 12 which, when operative, changes its position in accordance with the phase displacement of the voltages of the circuits 2 and 3. As shown, the rotatable device 12 comprises a dynamo-electric machine 13 driving a rotatable contact 14. The dynamo-electric machine 13 has a polyphase winding on its rotor and a polyphase winding on its stator which are arranged to be connected respectively to the circuits 2 and 3 by a relay 15. Therefore, when both of the windings of the dynamo-electric machine 13 are energized, the position of the rotatable contact 14 varies in accordance with the phase angle displacement of the voltages of the circuits 2 and 3. For the purpose of this description, it is assumed that the device 12 is so constructed that the rotatable contact 14 makes one complete revolution while a 360° phase displacement is occurring between the voltages of the circuits 2 and 3, i. e. during each slip cycle.

Associated with the rotatable contact 14 are a plurality of stationary contacts 16–27, inclusive, which are respectively so located in the path of movement of the rotatable contact 14 that they are engaged by the rotating contact during different predetermined ranges of phase angle displacement of the voltages of the circuits 2 and 3. For example, in the particular embodiment shown in the drawing, it will be assumed that the contact 16 is so constructed that the rotatable contact 14 is in engagement therewith when the voltage of one of the circuits 2 and 3, such for example as circuit 2, leads or lags the voltage of the other circuit less than 30°; that the contact 17 is so constructed that the rotatable contact 14 is in engagement therewith when the voltage of the circuit 2 leads the voltage of the circuit 3 30°; that the contact 18 is so constructed that the rotatable contact 14 is in engagement therewith when the voltage of the circuit 2 leads the voltage of the circuit 3 more than 30° but less than 90°; that the contact 19 is so constructed that the rotatable contact 14 is in engagement therewith when the voltage of the circuit 2 leads the voltage of the circuit 3 90°; that the contact 20 is so constructed that the rotatable contact 14 is in engagement therewith when the voltage of the circuit 2 leads the voltage of the circuit 3 more than 90° but less than 150°; that the contact 21 is so constructed that the rotatable contact 14 is in engagement therewith when the voltage of the circuit 2 leads the voltage of the circuit 3 150°; that the contact 22 is so constructed that the rotatable contact 14 is in engagement therewith when the voltage of the circuit 2 leads or lags the voltage of the circuit 3 more than 150°; that the contact 23 is so constructed that the rotatable contact 14 is in engagement therewith when the voltage of the circuit 2 lags the voltage of the circuit 3 150°; that the contact 24 is so constructed that the rotatable contact 14 is in engagement therewith when the voltage of the circuit 2 lags the voltage of the circuit 3 more than 90° but less than 150°; that the contact 25 is so constructed that the rotatable contact 14 is in engagement therewith when the voltage of the circuit 2 lags the voltage of the circuit 3 90°; that the contact 26 is so constructed that the rotatable contact 14 is in engagement therewith when the voltage of the circuit 2 lags the voltage of the circuit 3 more than 30° but less than 90°; and that the contact 27 is so constructed that the rotatable contact 14 is in engagement therewith when the voltage of the circuit 2 lags the voltage of the circuit 3 30°.

It will be evident that the number of stationary contacts and the relative sizes and locations thereof will vary for different applications of the invention.

The relays 28–39, inclusive, are respectively connected to the stationary contacts 16–27, inclusive, so that each relay is energized when the stationary contact to which it is connected is also engaged by the rotatable contact 14. The relays 28, 30, 32, 34, 36 and 38 are time relays of the well known type which do not pick up until after they have been energized for a predetermined time, whereas the relays 29, 31, 33, 35, 37 and 39 are time relays of the well known type which pick up instantaneously when they are energized but do not drop out until a predetermined time after they are deenergized.

For the purpose of this description, it will be assumed that, when the voltage of the circuit 2 leads or lags the voltage of the circuit 3 more than 150°, it is desirable to reclose the breaker only in case the frequency difference is also less than 1 cycle per second, that when the voltage of the circuit 2 leads or lags the voltage of the circuit 3 less than 150°, it is desirable to reclose the circuit breaker 1 only in case the frequency difference is also less than 2 cycles per second, that when the voltage of the circuit 2 leads or lags the voltage of the circuit 3 less than 90°, it is desirable to reclose the circuit breaker 1 only in case the frequency difference is also less than 3 cycles per second and that, when the voltage of the circuit 2 leads or lags the voltage of the circuit 3 less than 30°, it is desirable to reclose the circuit breaker 1 only in case the frequency difference is also less than the 4 cycles per second. Therefore, in the arrangement shown the time delay of the relay 34 is adjusted so that it picks up when continuously energized for approximately $\frac{1}{6}$ of a second; the time delays of the relays 32 and 36 are adjusted so that they pick up when continuously energized for approximately $\frac{1}{12}$ of a second; the time delays of the relays 30 and 38 are adjusted so that they pick up when continuously energized for $\frac{1}{18}$ of a second; and the time delay of relay 28 is adjusted so that it picks up when continuously energized for approximately $\frac{1}{24}$ of a second. It is obvious that in some cases it may be desirable to omit the relay 34 in order to prevent reclosing when the angular displacement is more than 150° because the two systems may not be able to pull into step from such an angular displacement or may be too severely stressed.

Each of the relays 29, 31, 33, 35, 37 and 39 has its time delay adjusted so that it is less than $\frac{1}{24}$ of a second so that, for all frequency differences of less than 4 cycles per second, each of these relays returns to its normal position while the rotatable contact 14 is in engagement with the next adjacent stationary contact, but for all frequency differences of 4 cycles per second or more, each of these relays does not return to its normal position until after the rotatable contact 14 has moved out of engagement with the next adjacent stationary contact. When any one of the relays 28, 30, 32, 34, 36 and 38 is energized and the two relays, connected to the two stationary contacts adjacent to the stationary contact to which the energized relay is connected, are simultaneously in their deenergized positions, an energizing circuit is completed for a control relay 40 which, in turn, completes an energizing circuit for the closing coil 6 to effect a reclosure of the circuit breaker 1. Therefore, only when the frequency difference is less than 4 cycles per second is it possible to complete an energizing circuit for the control relay 40. When the frequency difference is 3 cycles per second or more but less than 4 cycles per second, the length of time the rotatable contact 14 is in engagement with each of the stationary contacts 16, 18, 20, 22, 24 and 26 is sufficient to pick up only the relay 28, so that the angular displacement of the voltages of the circuits 2 and 3 must be less than 30° in order to effect the reclosing of the circuit breaker 1. When the frequency difference is 2 cycles per second or more but less than 3 cycles per second, the length of time the rotatable contact 14 is in engagement with each of the contacts 16, 18, 20, 22, 24 and 26 is sufficient to pick up the relays 28, 30 and 38, so that the angular displacement of the voltages of the circuits 2 and 3 must be less than 90° in order to effect a reclosing of the circuit breaker 1. When the frequency difference is 1 cycle per second or more but less than 2 cycles per second, the length of time the rotatable contact 14 is in engagement with each of the contacts 16, 18, 20, 22, 24 and 26 is sufficient to pick up the relays 28, 30, 32, 34, 36 and 38, so that angular displacement of the voltages of the circuits 2 and 3 must be less than 150° in order to effect the reclosing of the circuit breaker 1. When the frequency difference is less than 1 cycle per second, the length of time the rotatable contact 14 is in engagement with each of the contacts 16, 18, 20, 22, 24 and 26 is sufficient to pick up each of the relays 28, 30, 32, 34, 36 and 38, so that the reclosing of the circuit breaker 1 can be effected at any angular displacement of the voltages of the circuits 2 and 3.

In order to prevent the angular displacement responsive device 12 from effecting a reclosure of the circuit breaker 1 in case the voltages of the circuits 2 and 3 are too low or the phase rotations thereof are reversed with respect to each other, I provide, in the energizing circuit of the operating coil 42 of the relay 15 the series connected contacts 43 and 44 of suitable voltage rotation and phase balance relays 45 and 46 respectively connected to the circuits 2 and 3.

Also, in order to prevent the relays 28–39, inclusive, from being energized until after the device 12 has had time to assume its proper position in accordance with the phase displacement of the voltages of the circuits 2 and 3, I provide in the energizing circuit of each of these relays the contacts 50 of a time relay 51 which is arranged to be energized in response to the operation of the control relay 15. In most electric power systems the rate-of-change of the frequency difference of the two circuits 2 and 3, while the angular displacement responsive device 12 is operating to control the reclosing of the circuit breaker 1, is so small that no material change in the phase displacement of the two voltages occurs during the closing operation of the circuit breaker 1. However, in some cases, it may be desirable to prevent the circuit breaker 1 from being reclosed when the rate-of-change of the frequency difference is above a predetermined value even though the frequency difference and the phase angle displacement may be such as to effect the operation of one of the control relays 28, 30, 32, 34, 36 and 38. In the embodiment of my invention shown in the drawing, I accomplish this result by having the dynamo-electric machine 13 drive a suitable rate-of-change device 75 which is so designed that it closes its contacts 76 and 77 or 77 and 78 when the rate-of-change of the frequency difference exceeds a predetermined amount. As shown, the rate-of-change device 75 includes a member 79 of relatively large inertia which is connected to the shaft of the machine 13 by suitable flexible means, such as springs 80 so that the member 79 and the shaft may move relatively to each other in response to changes about a predetermined rate in the relative speeds of the shaft and the member 79. The member 79 carries the contacts 76 and 78 which are arranged to engage the contact 77, rigidly secured to the shaft of the machine 13 in response to such relative movements of the member 79 and the shaft of the machine 13. When the contact 77 is in engagement with either the contact 76 or 78, an energizing circuit is completed for a control relay 81 so as to open the contacts 82, which are connected in the energizing circuits of the control relays 28–39, inclusive.

The operation of the arrangement shown in the drawing is as follows:

When a fault or sustained out-of-step condition occurs, which causes the fault responsive means 9 to close its contacts 10, an energizing circuit is completed for the trip coil 8 through the auxiliary contacts 48 on the circuit breaker 1 so as to effect the opening thereof.

If the voltages of the circuits 2 and 3 are above predetermined values and the phase rotations thereof are correct so that the contacts 43 and 44 of the relays 45 and 46, respectively, are closed, the auxiliary contacts 49 on the circuit breaker 1 complete an energizing circuit for the control relay 15 which connects the windings of the dynamo-electric machine 13 to the circuits 2 and 3 so that the position of the rotating contact 14 depends upon the phase displacement of the voltages of the circuits 2 and 3, and the speed at which this contact 14 rotates is proportional to the frequency difference of the two circuits 2 and 3. The closing of the contacts 52 of the relay 15 also completes an energizing circuit for the time relay 51. If the rate of change of the frequency difference is below a predetermined value so that neither the contacts 76 and 77 nor the contacts 77 and 78 are closed to effect the opening of the contacts 82 of the relay 81 when the relay 51 closes its contacts 50, an energizing circuit is completed through the rotating contact 14 and the stationary contact with which it is then in engagement for the relay which is connected to that particular stationary contact, and the length of time this circuit is maintained depends upon the frequency difference of the two circuits 2 and 3.

When the frequency difference is 4 cycles per second or more, the rotating contact 14 does not remain in engagement with any of the stationary contacts 16, 18, 20, 22, 24 and 26 long enough during each slip cycle to pick up any of the relays 28, 30, 32, 34, 36 and 38 or to allow any of the relays 29, 31, 33, 35, 37 and 39 to drop out while the rotating contact 14 is in engagement with a stationary contact adjacent to the particular stationary contact through which the relay is energized.

When the frequency difference is 3 cycles per second or more but less than 4 cycles per second, the rotating contact 14 remains in engagement with the stationary contact 16 long enough during each slip cycle to pick up the relay 28 and to allow the relay 29 or 30, depending upon the direction of rotation of the contact 14, to drop out while the contacts 14 and 16 are in engagement. Therefore, when the relay 28 closes its contacts 54, an energizing circuit is completed for the control relay 40 through the contacts 55 of the relay 39, the contacts 56 of the relay 29 and the auxiliary contacts 57 on the circuit breaker 1. The closing of the contacts 58 of the control relay 40 completes an energizing circuit for the closing coil 6 so as to effect a reclosure of the circuit breaker 1. Therefore, when the frequency difference is 3 cycles per second or more but less than 4 cycles per second, the circuit of the control relay 40 can be completed to effect the reclosing of the circuit breaker 1 only during the phase displacement range of the voltages of the circuits 2 and 3 which causes the rotating contact 14 to be in engagement with the stationary contact 16.

When the frequency difference is 2 cycles per second or more but less than 4 cycles per second, the rotating contact 14 remains in engagement with the stationary contacts 16, 18 and 26 long enough during each slip cycle to pick up the relays 28, 30 and 38, respectively, and to allow each of the relays 37, 39, 29 and 31 to drop out while the rotating contact 14 is in engagement with the stationary contact adjacent to the stationary contact through which the relay is energized. Therefore, when the phase angle displacement of the voltages of the circuits 2 and 3 is such that the contacts 14 and 16 are in engagement, the energization of the time relay 28 effects the energization of the control relay 40 and the reclosure of the circuit breaker 1 in the manner heretofore described. When the phase angle displacement of the voltages is such that the contacts 14 and 26 are in engagement, an energizing circuit is completed for the time relay 38 through the contacts 50 of the relay 51. The closing of the contact 60 of the relay 38 completes through the contact 61 of the relay 37, the contact 62 of the relay 39 and the auxiliary contacts 57 on the circuit breaker 1 an energizing circuit for the control relay 40 so as to effect in the manner heretofore described the reclosure of the circuit breaker 1. When the phase angle displacement of the voltages is such that the contacts 14 and 18 are in engagement, a circuit is completed for the time relay 30 through the contacts 50 of the relay 51. The closing of the contacts 63 of the time relay 30 completes through the contacts 64 of the relay 29, the contacts 65 of the relay 31 and the auxiliary contacts 57 on the circuit breaker 1, an energizing circuit for the control relay 40 so as to effect the reclosure of the circuit breaker 1. Therefore, when the frequency difference is 2 cycles per second or more but less than 4 cycles per second, the circuit of the control relay can be completed to effect the reclosure of the circuit breaker 1 only during the range of phase angle displacement of the voltages which causes the rotating contact 14 to be in engagement with the stationary contacts 16, 18 and 26.

When the frequency difference is 1 cycle per second or more but less than 4 cycles per second, the rotating contact 14 remains in engagement with the stationary contacts 16, 18, 20, 24 and 26 long enough during each slip cycle to pick up the relays 28, 30, 32, 36 and 38, respectively, and to allow each of the relays 29, 31, 33, 35, 37 and 39 to drop out while the rotating contact 14 is in engagement with the stationary contacts adjacent to the stationary contact through which the relay is energized. Therefore, when the phase angle displacement of the voltages is such that the contact 14 is in engagement with the contact 16 or the contact 18 or the contact 26, the energization of the time relay 28, 30 or 38 effects the energization of the control relay 40 and the reclosure of the circuit breaker 1 in the manner heretofore described. When the phase angle displacement of the voltages is such that the contacts 14 and 20 are in engagement, a circuit is completed for the time relay 32 through the contacts 50 of the time relay 51. The closing of the contacts 66 of the relay 32 completes through the contacts 67 of the relay 31, contacts 68 of the relay 33 and the auxiliary contacts 57 on the circuit breaker 1 an energizing circuit for the control relay 40 so as to effect the reclosure of the circuit breaker 1. When the phase angle displacement of the voltages is such that the contacts 14 and 24 are in engagement, an energizing circuit is completed for the time relay 36 through the contacts 50 of the time relay 51. The closing of the contacts 69 of the relay 36 completes through the contacts 70 of the relay 35, contacts 71 of the relay 37 and the auxiliary contacts 57 on the circuit breaker 1 an energizing circuit for the control relay 40 so as to effect the reclosure of the circuit breaker 1. Therefore, when the frequency difference is 1 cycle per second or more but less than 4 cycles per second, the circuit of the control relay 40 can be completed to effect the reclosure of the circuit breaker 1 only during the range of phase angle displacements which causes the rotating contact 14 to be in engagement with the stationary contacts 16, 18, 20, 24 and 26.

When the frequency difference is less than 1 cycle per second, the rotating contact 14 remains in engagement with each of the stationary contacts 16, 18, 20, 22, 24 and 26 long enough during each slip cycle to pick up each of the relays 28, 30, 32, 34, 36 and 38. Therefore, when the phase angle displacement of the voltages is such that the contact 14 is in engagement with the contact 16 or 18 or 20 or 24 or 26, the energizing circuit of the control relay 40 is completed in the manner heretofore described to effect the reclosure of the circuit breaker 1. When the phase angle displacement of the voltages is such that the contact 14 is in engagement with the contact 22, an energizing circuit is completed for the time relay 34 through the contacts 50 of the relay 51. The closing of the contacts 72 of the relay 34 completes through the contacts 73 of relay 33, the contacts 74 of the relay 35 and the auxiliary contacts 57 on the circuit breaker 1 an energizing circuit for the control relay 40 so as to effect the reclosure of the circuit breaker 1. Therefore, when the frequency difference is less than 1 cycle per second, the circuit of the control relay 40 can be completed to effect the reclosure of the circuit breaker 1 during any phase angle displacement of the voltages of the circuits 2 and 3.

While I have, in accordance with the patent statutes, shown and described my invention as applied to a particular system and as embodying various devices diagrammatically indicated, changes and modifications will be obvious to those skilled in the art, and I therefore aim in the appended claims to cover all such changes and modifications as fall within the true spirit and scope of my invention.

What I claim as new and desire to secure by Letters Patent of the United States is:

1. In combination, two interconnected independently energized alternating current circuits, means for disconnecting said circuits from each other, and means dependent upon the frequency difference of said circuits when disconnected from each other for reconnecting said sources together during a range of phase angle displacement of the voltages of said circuits which varies inversely with the frequency difference.

2. In combination, two interconnected independently energized alternating current circuits, means for disconnecting said circuits from each other, and means dependent upon the frequency difference of said circuits when disconnected from each other for reconnecting said sources together during a predetermined range of phase angle displacement of the voltages of said circuits when the frequency difference is below a predetermined value and during a predetermined smaller range of phase angle displacement of said voltage when the frequency difference is above said predetermined value.

3. In combination, two interconnected independently energized alternating current circuits, means for disconnecting said circuits from each other, and means dependent upon the frequency difference of said circuits when disconnected from each other for reconecting said sources together during a predetermined range of said phase angle displacement of the voltages of said circuits when the frequency difference is below a predetermined value and during only a predetermined portion of said range when the frequency difference is above said predetermined value.

4. In combination, two interconnected independently energized alternating current circuits, means for disconnecting said circuits from each other, and means dependent upon the frequency difference of said circuits when disconnected from each other for reconnecting said sources together during progressively larger predetermined ranges of phase angle displacement of the voltages of said circuits as the frequency difference decreases.

5. In combination, two interconnected independently energized alternating current circuits, means for disconnecting said circuits from each other, a plurality of timing devices respectively having different operating times, means for effecting the operation of said devices respectively during different ranges of phase angle displacement of the voltages of said circuits when disconnected from each other, and means responsive to any of said timing devices completing its timing operation while said circuits are disconnected from each other for effecting the reconnection of said circuits.

6. In combination, two interconnected independently energized alternating current circuits, fault responsive means for disconnecting said circuits from each other, a rotatable contact, means for rotating said contact so that the position thereof varies in accordance with the phase angle displacement of the voltages of said circuits, a plurality of stationary contacts in the path of movement of said rotatable contact and respectively engaged thereby during predetermined phase angular displacements of said voltages, a plurality of timing relays respectively having different operating times and respectively connected to different stationary contacts, means for energizing each time relay when its respective stationary contact is engaged by said rotating contact, and means controlled by said relays for effecting the reconnection of said circuits.

7. In combination, two interconnected independently energized alternating current circuits, fault responsive means for disconnecting said circuits from each other, a rotatable contact, means for rotating said contact so that the position thereof varies in accordance with the phase angle displacement of the voltages of said circuits, a plurality of stationary contacts in the path of movement of said rotatable contact and respectively engaged thereby during predetermined phase angular displacements of said voltages, a plurality of timing relays respectively having different operating times and respectively connected to different stationary contacts so that the operating times of the relays connected to successive stationary contacts engaged by said rotating contact vary inversely with the phase angle displacement of said voltages causing the movement of said rotating contact, means for energizing each time relay when its respective stationary contact is engaged by said rotating contact, and means controlled by said relays for effecting the reconnection of said circuits.

8. In combination, two interconnected independently energized alternating current circuits, means for disconnecting said circuits from each other, means dependent upon the frequency difference of said circuits when disconnected from each other for reconnecting said sources together during a range of phase angle displacement of the voltages of said circuits which varies inversely with the frequency difference, and means dependent upon the rate-of-change of said frequency difference for rendering said reconnecting means inoperative.

9. In combination, two interconnected independently energized alternating current circuits, means for disconnecting said circuits from each other, means dependent upon the frequency difference of said circuits when disconnected from each other for reconnecting said sources together during a predetermined range of said phase angle displacement of the voltages of said circuits when the frequency difference is below a predetermined value and during only a predetermined portion of said range when the frequency difference is above said predetermined value, and means dependent upon the rate-of-change of said frequency difference for rendering said reconnecting means inoperative.

10. In combination, two interconnected independently energized alternating current circuits, means for disconnecting said circuits from each other, means dependent upon the frequency difference of said circuits when disconnected from each other for reconnecting said sources together during progressively larger predetermined ranges of phase angle displacement of the voltages of said circuits as the frequency difference decreases, and means dependent upon the rate-of-change of said frequency difference for rendering said reconnecting means inoperative.

SELDEN B. CRARY.